United States Patent [19]

Clark, Jr. et al.

[11] Patent Number: 4,672,661
[45] Date of Patent: Jun. 9, 1987

[54] CREDIT CARD TELEPHONE STATION

[75] Inventors: Robert A. Clark, Jr., Ft. Lauderdale; Jay D. Brussels, Lauderhill, both of Fla.

[73] Assignee: Communications Equipment and Engineering Co., Plantation, Fla.

[21] Appl. No.: 770,267

[22] Filed: Aug. 28, 1985

[51] Int. Cl.$^4$ .............................................. H04M 11/00
[52] U.S. Cl. ..................................... 379/144; 379/91; 235/482; 235/483
[58] Field of Search .................. 179/6.3 CC; 235/449, 235/493; 238/485, 484, 482, 483; 360/2

[56] References Cited

U.S. PATENT DOCUMENTS

| | | | |
|---|---|---|---|
| 3,462,567 | 8/1969 | Brown | 238/485 |
| 3,850,426 | 11/1974 | Blair | 291/238 |
| 4,259,699 | 3/1981 | Yoshida | 360/88 |
| 4,277,689 | 7/1981 | Thomas et al. | 250/567 |

FOREIGN PATENT DOCUMENTS 54-0127203 10/1979 Japan ............................ 179/6.3 CC

OTHER PUBLICATIONS

Telecom Division, Phillips & Brooks, Inc., advertisement on p. 53, "Telephony", 12/2/85.
Anritsu advertisement on p. 107 of "Telephony" 1/16/84.

*Primary Examiner*—Robert Lev
*Attorney, Agent, or Firm*—Mason, Kolehmainen, Rathburn & Wyss

[57] ABSTRACT

A credit card telephone station adapted to permit the initiation of telephone calls in response to the movement of a credit card having a stripe of magnetic characters on one face thereof past a magnetic card reader includes a housing for containing a telephone receiver-transmitter and circuit means including a magnetic card reader for enabling a call to be made. A telephone handset and supporting hook switch is provided and dial means accessible from the exterior of the housing is utilized for dialing calls. The telephone station includes a credit card receiving slot structure having an open edge accessible from outside the housing to permit a magnetic stripe containing portion of the credit card to be moved along a slot while manually gripped by a user. The slot structure includes a pair of spaced apart sidewalls, one of said walls having a window defined along a longitudinal path of movement for the credit card. The slot structure also includes a guide means between the walls adapted to be engaged by a longitudinal side edge of a credit card for guiding the card so as to align the stripe of magnetic characters to pass in front of the window for reading by the magnetic card reader which is positioned in front of the window. The slot structure includes a credit card receiving end portion wherein portions of the sidewalls diverge outwardly toward the open edge so as to facilitate the easy insertion of the card laterally inwardly into the slot so that one edge of the card engages the guide in readiness for movement of the card along the path toward the card reader. The guide means also includes an outwardly sloping cam surface adjacent an opposite, exit end of the slot for camming the card outwardly of the open slot after passage of the card beyond the card reader to facilitate withdrawal of the card from the slot structure by the user.

4 Claims, 5 Drawing Figures

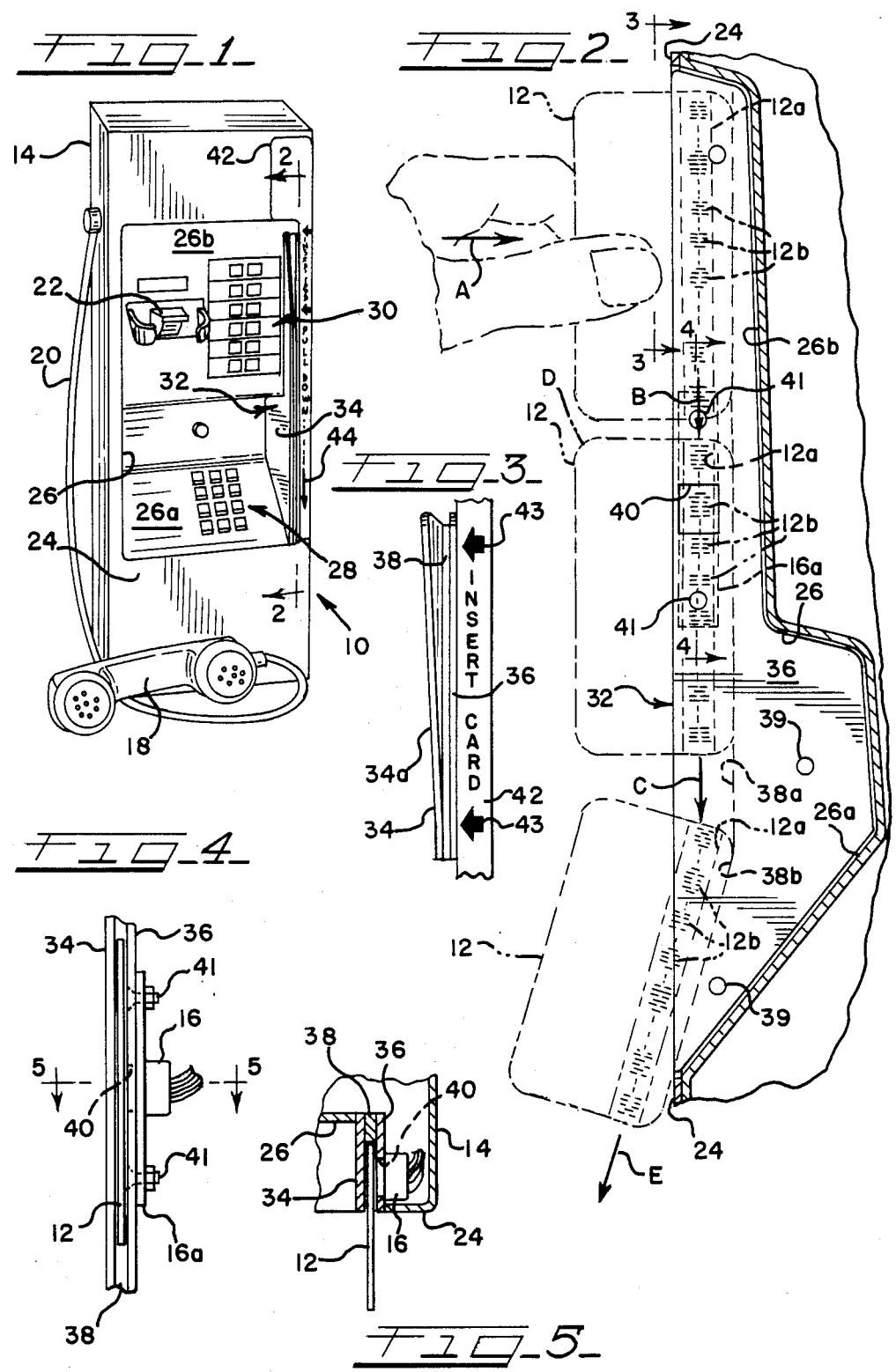

CREDIT CARD TELEPHONE STATION

BACKGROUND OF THE INVENTION

1. Field of the Invention

The present invention generally relates to a credit card telephone station which is adapted to permit the initiation of telephone calls in response to the movement of a credit card having a stripe of magnetic characters on one face thereof past a magnetic card reader contained in a housing and more particularly, relates to the credit card receiving slot structure for a telephone pay station. Passage of a magnetic credit card with the appropriate characters thereon past a card reader activates and enables a telephone circuit to be available for calls which can be dialed in a conventional manner.

2. Description of the Prior Art

Coin activated telephone stations and card insert activated telephone stations have been provided heretofore. The present invention relates to a credit card activated telephone station wherein a credit card having a stripe of magnetic characters on one face thereof is inserted into a specially designed slot structure and is then moved while gripped by the user past a card reader within the telephone station which enables the telephone receiver transmitter to be utilized if the credit card contains the proper magnetic characters. Information read by a card reader from the moving credit card is also used for billing purposes and the information generated and read is stored and available for a wide variety of different functions.

OBJECTS OF THE INVENTION

It is an object of the present invention to provide a new and improved credit card telephone station and more particularly a new and improved credit card telephone station especially adapted to permit the initiation of telephone calls in response to the movement of a credit card having a stripe of magnetic characters on one face thereof past a magnetic card reader contained internally of the housing of the telephone station.

It is another object of the present invention to provide a new and improved credit card telephone station of the character described having a new and unique slot structure with an open outer edge directly exposed for access to the public to permit manual insertion of a credit card therein and subsequent movement of the credit card down a guided path of movement past an internal card reader.

Yet another object of the present invention is to provide a new and improved credit card telephone station of the character described wherein the slot structure has an outwardly diverging wall section designed to facilitate initial insertion of the card into the slot with minimal wear and tear on the card.

Another object of the present invention is to provide a new and improved slot structure for a credit card telephone station wherein manually controlled movement of the credit card is carefully guided past a card reader so that accurate information is read and available to enable the caller to initiate a telephone call.

Yet another object of the present invention is to provide a new and improved credit card slot structure which permits the caller to retain a continuous manual grip on the credit card as the card is moved along the slot structure past the card reader.

Still another object of the present invention is to provide a new and improved slot structure for a credit card telephone station having a cam designed to aid the withdrawal of the card after movement past the card reading station.

Still another object of the present invention is to provide a new and improved credit card telephone station having a new and unique slot structure which minimizes wear and tear on the credit card and which facilitates accurate guidance of manipulation of the card past a card reader so that magnetic characters on a stripe on the face of the card are correctly interpreted and recorded to enable a call to be made and billing charges recorded.

Yet another object of the present invention is to provide a new and improved credit card telephone station which is neat in appearance, relatively simple and easy to use and generally foolproof in operation so as to minimize damage and mutilation of credit cards passed through a slot structure therein.

BRIEF SUMMARY OF THE INVENTION

The foregoing and other objects and advantages of the present invention are achieved in an illustrated embodiment herein which comprises a credit card telephone station especially adapted to permit the initiation of telephone calls in response to the manually controlled movement of a credit card having a stripe of magnetic characters on one face thereof past an interim magnetic card reader. The telephone station includes a housing for containing a telephone receiver-transmitter and a circuit including a magnetic card reader for enabling telephone calls to be initiated, completed and billed. A telephone handset and supporting hook switch is provided and a dial system is accessible for dialing calls.

The telephone credit card station includes a card receiving slot structure mounted on the housing and having an open outer edge which is accessible to the public for receiving a stripe containing portion of a credit card for manually controllable movement of the magnetic stripe along a path defined in the slot structure while the card is still manually gripped by the user. The slot structure includes a pair of spaced apart opposite sidewalls which define a longitudinal path of movement for the credit card and a guide is provided between the sidewalls adapted to be engaged by one edge of the credit card for guiding the card so as to align the stripe of magnetic characters to pass in front of a window formed in one of the sidewalls intermediate the ends. An internal magnetic card reader is positioned in front of the window within the housing for reading the characters on the magnetic stripe of a credit card to enable the calls to be made when particular characters are present on a credit card and ready by the reader. The slot structure includes a credit card receiving end wherein portions of the sidewalls diverge outwardly toward the open edge to facilitate insertion of the card laterally inwardly toward the path of movement until one longitudinal edge of the card directly engages against the guide means ready to be moved along the path toward the card reader. The guide further includes an outwardly sloping cam surface adjacent an opposite, exit end portion of the slot structure which cams the card outwardly of the open edge of the slot structure upon passage of the card beyond the card reader so as to facilitate withdrawal of the card from the slot by the user.

BRIEF DESCRIPTION OF THE DRAWINGS

For a better understanding of the present invention, reference should be had to the following detailed description taken in conjunction with the drawings, in which:

FIG. 1 is a front elevational perspective view of a new and improved credit card telephone station constructed in accordance with the features of the present invention;

FIG. 2 is a vertical sectional view of the credit card telephone station of FIG. 1 taken substantially along lines 2—2 thereof and illustrating the card slot structure for receiving and directing the movement of a credit card along a path for reading by a card reader;

FIG. 3 is a fragmentary, enlarged, front elevational view of an upper end portion of the slot structure for initially receiving a credit card inserted into the slot structure;

FIG. 4 is a fragmentary transverse cross sectional view of a card reading station of the slot structure taken substantially along lines 4—4 of FIG. 2; and FIG. 5 is a horizontally transverse cross sectional view of the card reading station taken substantially along lines 5—5 of FIG. 4.

DESCRIPTION OF A PREFERRED EMBODIMENT OF THE INVENTION

Referring now more particularly to the drawings and specifically FIG. 1, therein is illustrated a new and improved credit card telephone station referred to generally by the reference numeral 10. The telephone station is also referred to as a card reading public telephone and is accessible for use by customers with a credit card 12 of the type including a stripe or row 12a of magnetic characters 12b on one face thereof parallel to an adjacent longitudinal edge of the card. These types of cards have been developed for use in initiating and making telephone calls over the Bell Operating Company facilities and for inter local access and transport carrier (IC) facilities. The credit card telephone station 10 is intended to supplement and/or replace current types of charge-a-call stations and provide convenient usage capability for users with the inclusion of an internal magnetic card reader which functions to read and record information contained on the magnetic stripe 12a of the card.

In accordance with the present invention, the credit card telephone station 10 includes a generally rectangular housing 14 for containing and protecting a telephone receiver-transmitter and circuitry including a magnetic card reader 16 for enabling a call to be initiated, completed and billed from the information read and stored by the card reader 16 upon passage of a magnetic card 12 along an appropriate path as will be described in more detail hereinafter. The telephone station further includes a handset 18 connected to the internal circuitry of the station through a flexible cord 20 and a supporting hook switch and cradle 22 is provided to support the handset when not in use.

In accordance with the invention the housing 14 includes a generally rectangular, vertically upstanding front wall 24 having an indented central section 26 with a lower sloping portion 26a on which is mounted a standard array of pushbuttons 28 used for dialing calls.

Another array of pushbuttons 30 may be provided and designated with appropriate indicia thereby for billing or other purposes with specific carriers such as MCI, GTE Sprint, AT&T, etc. This upper array of pushbuttons is mounted on an upper segment 26b of the indented portion 26 and the hook switch cradle structure 22 is mounted to the left side of the array as shown in FIG. 1.

The credit card 12 is formed of plastic or other non-magnetic sheet material and is generally rectangular in shape with rounded corners as illustrated. On one surface of the card parallel to one longitudinal edge, there is provided a row or stripe 12a having a plurality of machine readable, magnetic characters 12b arranged in sequence along the stripe to provide the needed information for initiating, dialing and billing of calls made from the credit card station.

In accordance with the present invention, the telephone station 10 includes an elongated, generally vertically extending slot structure 32 mounted on the right hand side of the indented front wall portion 26 of the housing. As illustrated in FIG. 2, the slot structure 32 has an outline or profile which matches a sidewall of the indented portion on the left hand side of the telephone housing. In modifying an older type of charge telephone already in service, it has been found economical to replace or cover the right hand sidewall of the indented portion 26 of a telephone station housing with a slot structure 32 in accordance with the present invention. In new units, the slot structure 32 can be utilized in place of a right hand sidewall matching the profile of the left hand side wall of the indented section 26. The slot structure 32 is formed by a pair of elongated, opposite, spaced apart sidewalls 34 and 36 made of non-magnetic material such as stainless steel sheet material. The facing inside surfaces of the left hand and right hand slot structure sidewalls are maintained in spaced apart, generally parallel relation by a intermediate guide member 38 also formed of stainless steel and the individual, sandwiched together members 34, 36 and 38 are securely fastened together by fasteners such as screws 39 to form a sturdy slot structure for the telephone.

Intermediate the upper and lower ends of the slot structure, the right hand sidewall 36 is formed with a rectangular shaped window 40 so that the sensing elements of the magnetic card reader 16 can read the magnetic characters 12b on the surface of a credit card 12 passing by in front of the window as while guided along a prescribed path by the guide rib 38. The card reader 16 is secured to the right hand sidewall 36 as best shown in FIG. 14 by a pair of countersink head machine screws 41 which pass through a base flange 16a of the reader. At the upper end of the slot structure 32 the left hand sidewall 34 is bent to diverge outwardly away from parallel relationship with the opposite portion of the sidewall 36 so as to provide a wider open portion at the upper end of the slot structure 32 to facilitate manual insertion of a card 12 transversely into the slot structure until a longitudinal edge of the card closely adjacent the magnetic strip 12a firmly seated against the guide rib 38.

The front wall 24 of the telephone station housing 14 is provided with a decal or other placard 42 having a narrow elongated lower leg affixed to the housing front wall to the right of the slot structure 32. As best shown in FIGS. 2 and 3, a telephone user grasps the credit card and inserts the stripe containing portion into the slot so that the characters 12b on the magnetic stripe will directly face the inside surface of the right hand sidewall 36. The placard 42 is decorated with a pair of arrows 43 and the nomenclature "INSERT CARD" is printed therebetween directing the user to insert the card in this area by an inward thrust as indicated by the arrow "A" in FIG. 2 while still gripping the outer portion of the credit card.

Below the lower arrow 43, the decal 42 is provided with the printed words "PULL DOWN" and an extended arrow 44 is added at the lower end to provide explicit directions to the telephone user. The user continues to grip the credit card and moves his hand downwardly, all the time pressing the longitudinal edge against an upper guide surface 38a of the intermediate guide member 38 which is generally parallel to the front wall face of the telephone housing. This engagement insures that the magnetic stripe 12a of the credit card will move along a generally vertical path indicated by the arrows "B" and "C" so as to align the magnetic stripe 12a to pass directly in front of the card reader window 40 so that the card reader 16 may sequentially read and record the magnetic information contained on the card. When the lower edge of the card first passes the upper edge of the window, the card reading process begins to take place and continues until the upper or trailing end of the card moves past the lower edge of the window 40. Continued downward movement of the credit card in the slot structure 32 past the card reading position as shown by the dotted outline "D" in FIG. 2 results in engagement of the inner longitudinal edge of the card against a downwardly and outwardly sloping cam surface 38b. This engagement causes the card to be directed outwardly and downwardly as indicated by the arrow "E" (FIG. 2) in order to facilitate withdrawal of the card by the user after the magnetic characters thereon have passed the card reader 16 as described. If the card is a proper card with acceptable magnetic characters in a proper sequence thereon, the telephone user may then initiate and complete a call in a normal manner and the billing or charges will be handled of from the information as received by the card reader 16 and recorded.

An upper portion of the slot structure 32 comprises a credit card receiving end portion and the outwardly divergent wall segment 34a as shown in FIG. 3 widely opens up the open outer edge of the slot structure 32 in this area to make it easier to get the card 12 inserted properly into the upper end of the slot structure ready for passage downwardly along the card reading path as defined by the arrows "B" and "C". Inward pressure by the user of the card in a direction generally transverse to the guide surface 38a insures that the characters 12b on the magnetic strip 12a of the card will be properly aligned for reading as they pass by the card reader 16 at the viewing window 40. At the lower end of the slot structure 32 there is provided an outwardly and downwardly sloping cam surface 38b on the guide rib 38 so as to direct the cards outwardly of the slot structure 22 for easy removal by the user.

During a cycle of a card being read, the user is able to continuously maintain a grip on the card and does not lose possession thereof. In some types of card reading structures, a card is thrust inwardly and possession is then surrendered during card reading process. In order to insure efficient card reading without incorrect interpretations, the width of the card slot structure 32 is carefully maintained during manufacture in order to provide relatively free and easy manually controlled movement of the card along the slot structure while maintaining the card in close enough proximity to the sensors of the magnetic card reader 16 so that an accurate input of data will be obtained.

In a unit constructed in accordance with the invention, the slot opening or space between the inside opposite faces of the sidewalls 34 and 36 is maintained at 0.060" with a tolerance of +0.005 and a negative tolerance of 0. In addition, the position of the guide surface 38a relative to the card reading window 40 is accurately maintained so that the center line of the magnetic card reader 16 will always be within plus or minus 0.005" of the center line of the card stripe 12a on a card when the adjacent parallel edge of the card is moved in contact with the surface 38a.

It will thus be seen that the telephone station 10 and unique slot structure 32 for effecting magnetic reading of the credit card 12 is a relatively foolproof and easy-to-utilize system for making and billing local and long distance telephone calls.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A credit card telephone station adapted to permit the initiation of a telephone call in response to the movement of a credit card having a stripe of magnetic characters on one face thereof past a magnetic card reader, said telephone station comprising:

a housing for containing a telephone receiver-transmitter and circuit means including magnetic card reader means for enabling telephone calls to be made, a telephone handset and supporting hook switch and dial means accessible for dialing a call; and a credit card receiving, elongated slot on said housing having an open edge accessible from outside said housing for receiving a stripe containing portion of said credit card for movement of said stripe along said slot while said card is continously manually gripped by a user of said telephone station;

said slot formed between a pair of spaced apart, generally parallel opposite side walls having opposed inside faces defining a longitudinally extending path of movement for said credit card and a card edge engaging spacer and guide sandwiched between said opposed inside faces of said side walls adapted to be engaged by a selected longitudinal edge of said credit card for guiding said card for longitudinal travel along a linear, intermediate portion of said path so as to align said stripe of magnetic character to pass along a straight line in front of window means formed in at least one of said side walls at a location intermediate the ends thereof; and said magnetic card reader being positioned in front of said window means for reading said magnetic characters on said stripe passing in a straight line thereby for enabling a call to be made when particular characters are present on said card;

said slot including a credit card receiving portion adjacent one end wherein an outer edge portion of at least one of of said side walls diverges angularly away from the inside face of an opposite side wall outwardly toward said open edge of said slot thereby creating a wider spacing between said opposite inside faces of said side walls to facilitate lateral insertion of said card inwardly toward said guide and spacer until said selected longitudinal edge of said card engages said guide and spacer ready for movement of said card longitudinally along said path toward said card reader; and said guide and spacer including an outwardly sloping cam surface adjacent an exit end portion of said slot for camming said card outwardly of said open edge of said slot upon longitudinal passage of said card in said slot beyond said card reader to facilitate withdrawal of said card from said slot by said user, said sloping cam surface aligned to angularly intersect said linear intermediate portion of said guide and spacer at a point in said slot along said path wherein said stripe of magnetic characters of said credit card moved along said path has passed said card reader means for reading and said cam surface terminating at an opposite end of said slot adjacent said outer edge thereof.

2. The credit card telephone station of claim 1 wherein said one side wall of said slot is formed of non-magnetic material.

3. The credit card telephone station of claim 1 wherein said one side wall of said slot is formed of stainless steel.

4. The credit card telephone station of claim 1 wherein said spaced apart, opposite side walls are spaced apart in a range between 0.060" and 0.065".

* * * * *